US011906949B2

(12) United States Patent
Shao et al.

(10) Patent No.: US 11,906,949 B2
(45) Date of Patent: Feb. 20, 2024

(54) INDUSTRIAL INTERNET OF THINGS, CONTROL METHODS, AND STORAGE MEDIUM FOR SHEET WORKPIECE PROCESSING

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Junyan Zhou, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/315,489

(22) Filed: May 10, 2023

(65) Prior Publication Data
US 2023/0280729 A1 Sep. 7, 2023

(30) Foreign Application Priority Data
Jan. 30, 2023 (CN) .......................... 202310044323.X

(51) Int. Cl.
*G05B 19/418* (2006.01)
(52) U.S. Cl.
CPC ... *G05B 19/41865* (2013.01); *G05B 19/4183* (2013.01); *G05B 19/4185* (2013.01); *G05B 19/41875* (2013.01)
(58) Field of Classification Search
USPC .......................................................... 700/95
See application file for complete search history.

(56) References Cited

U.S. PATENT DOCUMENTS

2014/0015957 A1* 1/2014 Fujikawa .................. H04N 7/18
348/95
2014/0028839 A1* 1/2014 Ishibashi .............. H04N 25/611
348/242
(Continued)

FOREIGN PATENT DOCUMENTS

CN 1694644 A 11/2005
CN 101195318 A 6/2008
(Continued)

OTHER PUBLICATIONS

Notification to Grant Patent Right for Invention in Chinese Application No. 202310044323.X dated Apr. 27, 2023, 4 pages.
(Continued)

*Primary Examiner* — Hien D Khuu
(74) *Attorney, Agent, or Firm* — METIS IP LLC

(57) ABSTRACT

The present disclosure provides an Industrial Internet of Things, a control method and storage medium for sheet workpiece processing. The Industrial Internet of Things includes a detecting module and a processing module; the detecting module is configured to detect a machining process of a sheet workpiece to obtain detection information; and the processing module is configured to adjust a production device based on the detection information. By detecting and adjusting a sheet workpiece, on the one hand, the present disclosure can effectively improve the subsequent processing accuracy of the sheet workpiece, on the other hand, the present disclosure can simplify an adjustment process and improve the adjustment efficiency of a bearing mechanism of a target sheet workpiece.

8 Claims, 6 Drawing Sheets

(56) References Cited

U.S. PATENT DOCUMENTS

2018/0222049 A1\* 8/2018 Suzuki .................... B25J 9/161
2022/0197246 A1  6/2022 Cella et al.

FOREIGN PATENT DOCUMENTS

| CN | 101256399 A | 9/2008 |
| CN | 107123086 A | 9/2017 |
| CN | 107635724 A | 1/2018 |
| CN | 111338726 A | 6/2020 |
| CN | 113259598 A | 8/2021 |
| CN | 113552094 A | 10/2021 |
| CN | 113678064 A | 11/2021 |
| CN | 114629940 A | 6/2022 |
| CN | 114637270 A | 6/2022 |
| CN | 115065708 A | 9/2022 |
| CN | 115071184 A | 9/2022 |
| CN | 115208927 A | 10/2022 |
| JP | 2013042319 A | 2/2013 |
| JP | 2017107366 A | 6/2017 |

OTHER PUBLICATIONS

First Office Action in Chinese Application No. 202310044323.X dated Apr. 10, 2023, 11 pages.

Liu, Quanyu, A Novel Measurement Method for the Residual Stress in Aircraft Canopy, Chinese Master's Theses Full-text Database, 2009, 83 pages.

Shivaprasad Shridhara Bhat et al., Sizing limitations of ultrasonic array images for non-sharp defects and their impact on structural integrity assessments, Theoretical and Applied Fracture Mechanics, 1-13, 2022.

\* cited by examiner

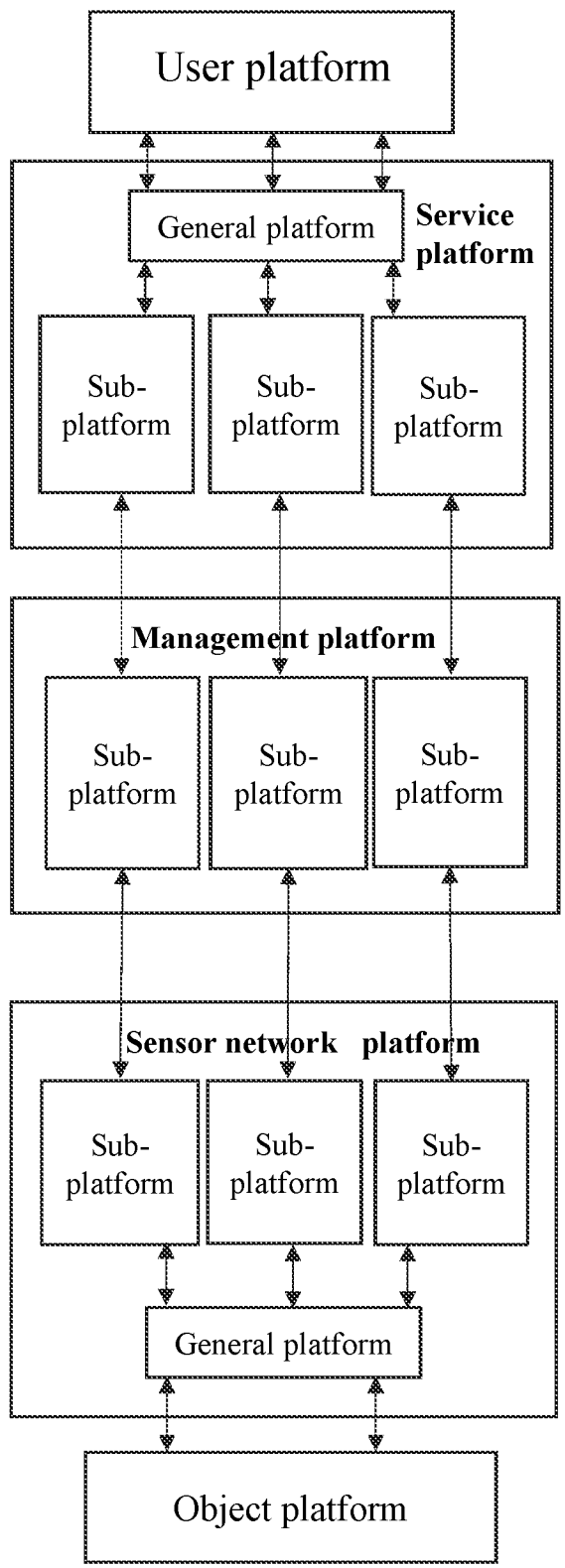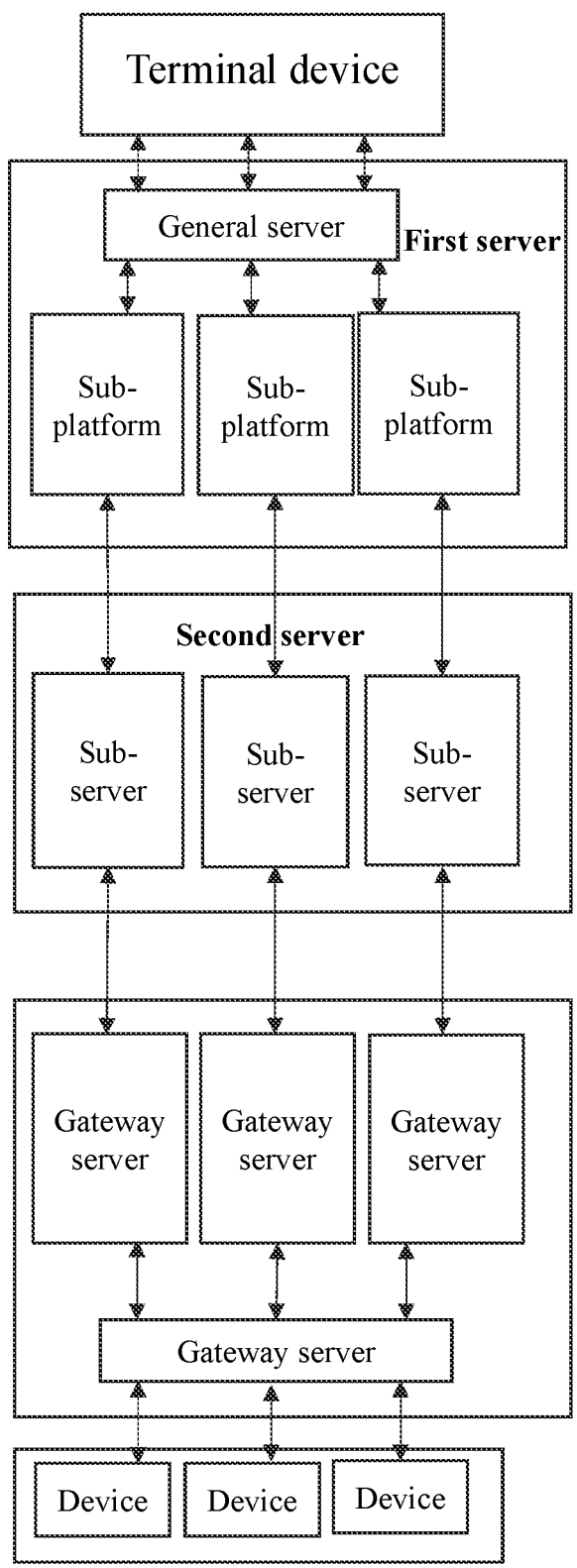
FIG. 2

300

310 — Obtaining, by an obtaining unit, a first target image on a production line through a sensor network platform; the first target image being an image of a target sheet workpiece under a fixed focal length condition 320 — Performing, by a generating unit, sharpness analysis on the first target image to generate a sharpness matrix, and calculating a tilt direction and a tilt angle of the target sheet workpiece as tilt data according to the sharpness matrix; and determining deformation data of the target sheet workpiece through a first preset method based on the first target image 330 — Inputting, by a correcting unit, the tilt data and the first target image into a tilt correction model, and receiving a second target image output by the tilt correction model; the second target image being an image of the target sheet workpiece in a completely horizontal state 340 — Performing, by a calibrating unit, calibration and identification on the second target image, generating horizontal adjustment data and rotational adjustment data corresponding to the second target image, calculating tilt adjustment data based on the tilt data, and adjusting clamping parameters based on tilt data and deformation data of a plurality of target sheet workpieces through a second preset method 350 — Sending, by an adjusting unit, the horizontal adjustment data, the rotational adjustment data, and the tilt adjustment data to the production line through the sensor network platform to adjust a bearing mechanism of the target sheet workpiece 360 — Sending, by a communicating unit, the horizontal adjustment data, rotational adjustment data, and tilt adjustment data to the user platform through the service platform for display

```
┌─────────────────────────────────────────────────┐
│ Determining a relative position diagram of the target │ ～ 410
│ sheet workpiece based on the first target image │
└─────────────────────────────────────────────────┘
                        │
                        ▼
┌─────────────────────────────────────────────────┐
│ Determining deformation data of the target sheet │ ～ 420
│ workpiece based on the relative position diagram of │
│        the target sheet workpiece                │
└─────────────────────────────────────────────────┘
```

```
┌─────────────────────────────────────────────┐
│ Processing tilt data and deformation data of a │  ~ 610
│ plurality of target sheet workpieces to obtain feature │
│                    value                     │
└─────────────────────────────────────────────┘
                       │
                       ▼
┌─────────────────────────────────────────────┐
│ In response to the feature value not satisfying a │ ~ 620
│ preset condition, determining candidate adjustment │
│ clamping parameters through a vector database │
└─────────────────────────────────────────────┘
                       │
                       ▼
┌─────────────────────────────────────────────┐
│ Adjusting, by a calibrating unit, the candidate │ ~ 630
│ adjustment clamping parameters to obtain target │
│       adjustment clamping parameters         │
└─────────────────────────────────────────────┘
```

FIG. 6

INDUSTRIAL INTERNET OF THINGS, CONTROL METHODS, AND STORAGE MEDIUM FOR SHEET WORKPIECE PROCESSING

CROSS-REFERENCE TO RELATED APPLICATIONS

The present disclosure claims priority of Chinese Patent Application No. 202310044323.X, filed on Jan. 30, 2023, the entire contents of which are hereby incorporated herein by reference.

TECHNICAL FIELD

The present disclosure relates to intelligent manufacturing Industrial Internet of Things technology, and in particular, to an Industrial Internet of Things, a control method and storage medium for sheet workpiece processing.

BACKGROUND

A sheet workpiece is a common device to be processed in industrial manufacturing, such as LED panels, wafers, friction sheets, and flying sheets, which often requires high processing accuracy. In order to improve the processing accuracy of the sheet workpiece, it is necessary to improve the recognition accuracy of the sheet workpiece before processing. However, due to the relatively large area and relatively small thickness of the sheet workpiece, rotation and translation are prone to occur during a grasping process, and deformation is easily caused by the offset of a processing device during a machining process, so error is prone to occur.

Therefore, it is hoped that an Industrial Internet of Things, a control method and storage medium for processing a sheet workpiece can be provided, so as to reduce error during sheet workpiece processing.

SUMMARY

One or more embodiments of the present disclosure provide an Industrial Internet of Things, a control method and storage medium for sheet workpiece processing. The Industrial Internet of Things includes: a detecting module and a processing module. The detecting module is configured to detect a machining process of a sheet workpiece to obtain detection information; and the processing module is configured to adjust a production device based on the detection information.

First, the embodiments of the present disclosure provide an Industrial Internet of Things for sheet workpiece processing, comprising a user platform, a service platform, a management platform, a sensor network platform, and an object platform connected in sequence, the detecting module executed by the object platform and the sensor network platform, the processing module executed by the service platform, the management platform, and the user platform, wherein the management platform includes: an obtaining unit configured to obtain a first target image on a production line through the sensor network platform; wherein the first target image is an image of a target sheet workpiece under a fixed focal length condition; a generating unit configured to perform sharpness analysis on the first target image to generate a sharpness matrix, calculate a tilt direction and tilt angle of the target sheet workpiece as tilt data according to the sharpness matrix; and determine deformation data of the target sheet workpiece through a first preset method based on the first target image; a correcting unit configured to input the tilt data and the first target image into a tilt correction model, and receive a second target image output by the tilt correction model; wherein the second target image is an image of the target sheet workpiece in a completely horizontal state; a calibrating unit including a first calibrating unit and a second calibrating unit; wherein the first calibrating unit is configured to perform calibration and identification on the second target image, generate horizontal adjustment data and rotational adjustment data corresponding to the second target image, and calculate tilt adjustment data according to the tilt data; the second calibrating unit is configured to adjust clamping parameters through a second preset method based on tilt data and deformation data of a plurality of target sheet workpieces; an adjusting unit configured to send the horizontal adjustment data, the rotational adjustment data, and the tilt adjustment data to the production line through the sensor network platform to adjust a bearing mechanism of the target sheet workpiece; a communicating unit configured to send the horizontal adjustment data, the rotational adjustment data, and the tilt adjustment data to the user platform through the service platform for display.

In the prior art, a sheet workpiece is generally grasped by a suction cup manipulator and placed on a processing platform for processing, and the processing platform often uses a suction cup to absorb and fix the sheet workpiece, which makes the sheet workpiece prone to tilt and shift if the suction cup control is not accurate enough, and requires alignment of the sheet workpiece.

The embodiments of the present disclosure adopt a scheme that uses a camera with a fixed focal length to capture the sheet workpiece for alignment of the sheet workpiece when being applied. Different from the automatic focusing of the machine vision camera in the prior art, the first target image in the embodiments of the present disclosure is captured by a camera with a fixed focal length on a sheet workpiece. Since the focal length is fixed, when the sheet workpiece is not flat enough, there is a difference in the imaging effect of different regions of the sheet workpiece, and the difference can be expected. Performing sharpness analysis on the first target image to generate the sharpness matrix can be performed in various ways in the prior art, such as the 10/90 rising distance approach, and the frequency domain approach. Due to the particularity of the sharpness calculation, the sharpness matrix is not a pixel matrix, instead, the first target image is divided into several regular regions and the sharpness is calculated for each region. A tilt direction and a tilt angle of the target sheet workpiece may be calculated through the sharpness matrix.

In the embodiments of the present disclosure, in order to reduce a count of times of the camera taking pictures, the first target image is corrected through the tilt data to an image of the target sheet workpiece in a completely horizontal state. The correction process is mainly realized through a tilt correction model, and the tilt correction model may include a decision-making model such as a neural network model that can be used for decision-making. The decision-making model generates a decision-making plan for image processing according to the tilt data, and then an image processing model processes the first target image.

In the embodiments of the present disclosure, since a tilt correction is completed for the second target image, performing the horizontal adjustment and rotational adjustment of the target sheet workpiece by the second target image may be more accurate. When sending the horizontal adjustment data, rotational adjustment data, and tilt adjustment data to a corresponding bearing mechanism for adjustment, the tilt angle should be adjusted first, then the rotation angle is adjusted, and finally the horizontal angle is adjusted to ensure the accuracy of the adjustment.

In the embodiments of the present disclosure, by capturing one shot of the target sheet workpiece, tilt adjustment, horizontal adjustment and rotational adjustment of the target sheet workpiece can be performed. On the one hand, the subsequent processing accuracy of the sheet workpiece is effectively improved, and on the other hand, the adjustment can be simplified and the adjustment efficiency of a bearing mechanism of the target sheet workpiece can be improved.

In a possible implementation manner, the generating unit is further configured to search for sharpness elements with a sharpness lower than a standard value and with a same sharpness in the sharpness matrix as same degree sharpness elements; connecting the same degree sharpness elements into a straight line in the first target image, and calculating the tilt direction according to the straight line.

In a possible implementation manner, the generating unit is further configured to obtain a plurality of straight lines connected by a plurality of sets of same degree sharpness elements in the first target image, and calculate the tilt angle and tilt direction according to position relationships between the plurality of straight lines and the tilt angle.

In a possible implementation manner, the correction unit is further configured to: when inputting the tilt data and the first target image into a tilt correction model, determine a correction direction according to the tilt direction, determine a correction gradient according to the tilt angle through the tilt correction model; and performing stretching processing corresponding to the correction gradient the first target image to the second target image according to the correction direction through the tilt correction model.

In a possible implementation manner, the calibrating unit is further configured to: identify a first feature point and a second feature point in the second target image; wherein the first feature point corresponds to an identification point or an identification area of the target sheet workpiece; the second feature point corresponds to another identification point or another identification area of the target sheet workpiece; establish a connection line between the first feature point and the second feature point as a calibration connection line; calculate an angle between the calibration connection line and a standard line in a standard template as the rotational adjustment data; wherein the standard template is an image of the target sheet workpiece in a standard processing position; and the standard connection line is a connection line between the first feature point and the second feature point in the standard template; calculate a difference between a midpoint of the calibration connection line and a midpoint of the standard connection line on a horizontal axis and vertical axis in a standard horizontal coordinate system as the horizontal adjustment data; wherein the standard horizontal coordinate system is a Cartesian coordinate system established on a horizontal plane in the standard template.

In a possible implementation manner, the service platform includes a general service platform and at least two service sub-platforms, and different service sub-platforms are configured to receive different types of data transmitted by the management platform; the general service platform summarizes data collected by all the service sub-platforms and sends the data to the user platform for display. The management platform includes a plurality of mutually independent management sub-platforms, and an obtaining unit, generating unit, correcting unit, calibrating unit, adjusting unit and communicating unit are configured in a same management sub-platform. The sensor network platform includes a general sensor network platform and at least two sensor network sub-platforms, the general sensor network platform receives all production data on the production line, and the sensor network sub-platforms send different types of production data to the management platform respectively.

Second, the embodiments of the present disclosure provide a control method of Industrial Internet of Things for sheet workpiece processing, wherein the control method includes: obtaining a first target image on a production line through a sensor network platform; wherein the first target image is an image of a target sheet workpiece under a fixed focal length condition; performing sharpness analysis on the first target image to generate a sharpness matrix, and calculating a tilt direction and a tilt angle of the target sheet workpiece as tilt data according to the sharpness matrix; inputting the tilt data and the first target image into a tilt correction model, and receiving a second target image output by the tilt correction model; wherein the second target image is an image of the target sheet workpiece in a completely horizontal state; performing calibration and identification on the second target image, generating horizontal adjustment data and rotational adjustment data corresponding to the second target image, and calculating tilt adjustment data according to the tilt data; sending the horizontal adjustment data, rotational adjustment data and tilt adjustment data to the production line through the sensor network platform to adjust a bearing mechanism of the target sheet workpiece; and sending the horizontal adjustment data, rotational adjustment data, and tilt adjustment data to a user platform through a service platform for display.

In a possible implementation manner, calculating a tilt direction and a tilt angle of the target sheet workpiece as tilt data according to the sharpness matrix includes: searching for sharpness elements with a sharpness lower than a standard value and with a same sharpness in the sharpness matrix as same degree sharpness elements; connecting the same degree sharpness elements into a straight line in the first target image, and calculating the tilt direction according to the straight line; obtaining a plurality of straight lines connected by a plurality of sets of same degree sharpness elements in the first target image, and calculate the tilt angle according to position relationships between the plurality of straight lines and the tilt direction.

In a possible implementation manner, inputting the tilt data and the first target image into a tilt correction model, and receiving a second target image output by the tilt correction model includes: when inputting the tilt data and the first target image into the tilt correction model, determining, through the tilt correction model, a correction direction according to the tilt direction, determining, through the tilt correction model, a correction gradient according to the tilt angle; and performing, through the tilt correction model, stretching processing corresponding to the correction gradient on the first target image to the second target image according to the correction direction.

In a possible implementation manner, performing calibration and identification on the second target image, and generating horizontal adjustment data and rotational adjustment data corresponding to the second target image includes: identifying a first feature point and the second feature point in the second target image; wherein the first feature point corresponds to an identification point or an identification area of the target sheet workpiece; and the second feature point corresponds to another identification point or another identification area of the target sheet workpiece; establishing a connection line between the first feature point and the second feature point as a calibration connection line; calculating an angle between the calibration connection line and a standard connection line in a standard template as the rotational adjustment data; wherein the standard template is an image of the target sheet workpiece in a standard processing position; and the standard connection line is a connection line between the first feature point and the second feature point in the standard template; calculating a difference between a midpoint of the calibration connection line and a midpoint of the standard connection line on a horizontal axis and vertical axis in a standard horizontal coordinate system as the horizontal adjustment data; wherein the standard horizontal coordinate system is a Cartesian coordinate system established on a horizontal plane in the standard template.

Third, the embodiments of the present disclosure provide a non-transitory computer-readable storage medium storing computer instructions, wherein a computer implements the control method of Industrial Internet of Things for sheet workpiece processing when reading the computer instructions.

In some embodiments of the present disclosure, the Industrial Internet of Things, control method, and storage medium for sheet workpiece processing can complete tilt adjustment, horizontal adjustment, and rotational adjustment of the target sheet workpiece by capturing a target sheet workpiece. On the one hand, it effectively improves the subsequent processing accuracy of the sheet workpiece, on the other hand, it can simplify an adjustment process, and improve the adjustment efficiency of a bearing mechanism of the target sheet workpiece.

BRIEF DESCRIPTION OF THE DRAWINGS

The present disclosure is further described in terms of exemplary embodiments. These exemplary embodiments are described in detail with reference to the drawings. These embodiments are not limited, in these embodiments, the same numeral denotes the same structure, wherein:

FIG. 2 is a schematic diagram illustrating an exemplary structure of the Industrial Internet of Things for sheet workpiece processing according to some embodiments of the present disclosure;

FIG. 3 is a flowchart illustrating a control method of Industrial Internet of Things for sheet workpiece processing according to some embodiments of the present disclosure;

FIG. 4 is a flowchart illustrating an exemplary process for determining deformation data according to some embodiments of the present disclosure;

FIG. 6 is a flowchart illustrating an exemplary process for adjusting clamping parameters according to some embodiments of the present disclosure.

DETAILED DESCRIPTION

Figure 1:
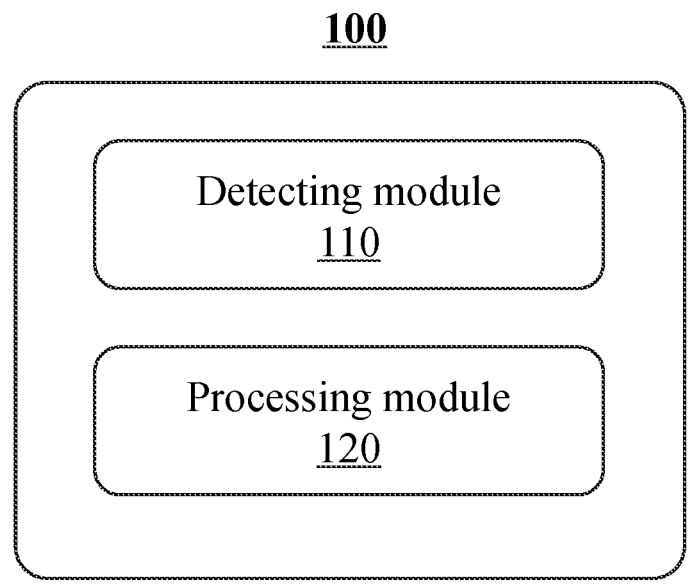
FIG. 1 is a schematic diagram illustrating an Industrial Internet of Things for sheet workpiece processing according to some embodiments of the present disclosure.

In order to illustrate the technical solutions of the embodiments of the present disclosure more clearly, the following briefly introduces the drawings that need to be used in the description of the embodiments. Apparently, the accompanying drawings in the following description are only some examples or embodiments of the present disclosure, and those skilled in the art can also apply the present disclosure to other similar scenarios. Unless obviously obtained from the context or the context illustrates otherwise, the same numeral in the drawings denotes the same structure or operation.

It should be understood that the words "system", "device", "unit" and/or "module" as used herein is a method for distinguishing different components, elements, parts, parts, or assemblies of different levels. However, the words may be replaced by other expressions if other words can achieve the same purpose.

As indicated in the present disclosure and claims, the terms "a", "an", and/or "the" are not specific to the singular and may include the plural unless the context clearly indicates an exception. Generally speaking, the terms "comprise" and "include" only suggest the inclusion of clearly identified steps and elements, and these steps and elements do not constitute an exclusive list, and the method or device may also contain other steps or elements.

The flowchart is used in the present disclosure to illustrate the operations performed by the system according to the embodiments of the present disclosure. It should be understood that the preceding or following operations are not necessarily performed in exact order. Instead, various steps may be processed in reverse order or simultaneously. At the same time, other operations can be added to these procedures, or a certain step or steps can be removed from these procedures.

FIG. 1 is a schematic diagram illustrating an Industrial Internet of Things for sheet workpiece processing according to some embodiments of the present disclosure.

In some embodiments, Industrial Internet of Things 100 for sheet workpiece processing may include detecting module 110 and processing module 120.

The detecting module 110 may be configured to detect a machining process of a sheet workpiece to obtain detection information. For more details about the detection information, please refer to FIG. 3 and its related descriptions.

The processing module 120 may be configured to adjust a production device based on the detection information. For more details about adjusting the production device, please refer to FIG. 3, FIG. 4, FIG. 5, and FIG. 6 and their related descriptions.

In some embodiments, the detecting module 110 may be executed by an object platform or a sensor network platform. The processing module 120 may be executed by a service platform, a management platform, or a user platform. For more details about the service platform, management platform, sensor network platform, and object platform, please refer to FIG. 2 and its related descriptions.

It should be understood that the system and modules shown in FIG. 1 may be implemented in various ways. It should be noted that the above description of the Industrial Internet of Things and modules for sheet workpiece processing is only for the convenience of description, and does not limit the present disclosure to the scope of the embodiments. It should be understood that for those skilled in the art, after understanding the principle of the system, it is possible to combine various modules or form a sub-system to connect with other modules without departing from the principle arbitrarily. In some embodiments, the detecting module 110 and the processing module 120 disclosed in FIG. 1 may be different modules in one system, or one module realizing the functions of the above-mentioned two or more modules. For example, each module may share one storage module, or each module may have its own storage module. Such deformations are within the protection scope of the present disclosure.

FIG. 2 is a schematic diagram illustrating an exemplary structure of the Industrial Internet of Things for sheet workpiece processing according to some embodiments of the present disclosure.

As a functional system shown in FIG. 2, the Industrial Internet of Things for sheet workpiece processing includes a user platform, a service platform, a management platform, a sensor network platform, and an object platform connected in sequence. The object platform is configured as a camera device, such as a camera with a fixed focal length. The management platform includes an obtaining unit configured to obtain a first target image on a production line through the sensor network platform; the first target image is an image of a target sheet workpiece under a fixed focal length condition; a generating unit configured to perform sharpness analysis on the first target image to generate a sharpness matrix and calculate a tilt direction and a tilt angle of the target sheet workpiece as tilt data according to the sharpness matrix; a correcting unit configured to input the tilt data and the first target image into a tilt correction model, and receive a second target image output by the tilt correction model; the second target image is an image of the target sheet workpiece in a completely horizontal state; a calibrating unit configured to perform calibration and identification on the second target image, generate horizontal adjustment data and rotational adjustment data corresponding to the second target image, and calculate tilt adjustment data according to the tilt data; an adjusting unit configured to send the horizontal adjustment data, the rotational adjustment data and the tilt adjustment data to the production line through the sensor network platform to adjust a bearing mechanism of the target sheet workpiece; and a communicating unit configured to send the horizontal adjustment data, the rotational adjustment data, and the tilt adjustment data to the user platform through the service platform for display.

In a possible implementation manner, the service platform includes a general service platform and at least two service sub-platforms, different service sub-platforms are configured to receive different types of data transmitted by the management platform; the general service platform summarizes data collected by all the service sub-platforms and sends the data to the user platform for display. The management platform includes a plurality of mutually independent management sub-platforms, and an obtaining unit, generating unit, correcting unit, calibrating unit, adjusting unit and communicating unit are configured in a same management sub-platform. The sensor network platform includes a general sensor network platform and at least two sensor network sub-platforms, and the general sensor network platform receives all production data on the production line, and sends different types of production data to the management platform respectively.

In some embodiments, a plurality of service sub-platforms respectively obtains one of the horizontal adjustment data, rotational adjustment data, and tilt adjustment data from the management platform, which are summarized by a general service platform and sent to a user platform for display. The general sensor network platform obtains first target images of all target sheet workpieces on a production line, and a plurality of sensor network sub-platforms obtain the first target images of different target sheet workpieces from the general sensor network platform, and send the first target images to the management platform respectively.

As a physical system shown in FIG. 2, the Industrial Internet of Things for sheet workpiece processing includes a terminal device, a first server, a second server, a plurality of gateway servers, and a plurality of devices. The first server includes a general server and a plurality of sub-servers. The second server includes a plurality of sub-servers. In some embodiments, the terminal device performs data interaction with the general server in the first server; the general server in the first server performs data interaction with the plurality of sub-servers; the first server and the second server perform data interaction through a respective plurality of sub-servers; the plurality of sub-servers of the second server perform data interaction with a plurality of gateway servers; the plurality of gateway servers interact with a general gateway server, and the general gateway server performs data interaction with the plurality of devices.

FIG. 3 is a flowchart illustrating a control method of Industrial Internet of Things for sheet workpiece processing according to some embodiments of the present disclosure. As shown in FIG. 3, process 300 includes the following steps. In some embodiments, the process 300 may be executed by a management platform.

In step 310, obtaining, by an obtaining unit, a first target image on a production line through a sensor network platform; the first target image being an image of a target sheet workpiece under a fixed focal length condition.

For example, the first target image may include an image of the target sheet workpiece captured by a fixed camera with a focal length of 30 cm, 40 cm, or the like.

When the embodiment of the present disclosure is implemented, an alignment scheme of a sheet workpiece is completed by using a camera with a fixed focal length to capture the sheet workpiece. Different from the automatic focusing of the machine vision camera in the prior art, the first target image in the embodiment of the present disclosure is obtained through capturing the sheet workpiece with a camera with a fixed focal length. Since the focal length is fixed, when the sheet workpiece is not flat enough, there is a difference in the imaging effect of different regions of the sheet workpiece, and the difference may be expected.

In step 320, performing, by a generating unit, sharpness analysis on the first target image to generate a sharpness matrix, and calculating a tilt direction and a tilt angle of the target sheet workpiece as tilt data according to the sharpness matrix; and determining deformation data of the target sheet workpiece through a first preset method based on the first target image.

The sharpness matrix may be a matrix used to reflect the definition of the image plane and the sharpness of the image edge. For example, the sharpness matrix may include a 4×5 matrix, a 9×9 matrix, or the like.

In some embodiments, the generating unit may generate a first target image sharpness matrix divided into a plurality of regular regions by performing sharpness analysis on the first target image. For example, the management platform may divide the first target image into a regular 9×9 sharpness matrix through the sharpness analysis.

The tilt data may be data reflecting a tilt degree of the target sheet workpiece. For example, the tilt data may include a tilt direction and a tilt angle of the target sheet workpiece, etc.

In some embodiments, the management platform may obtain the tilt direction and the tilt angle of the target sheet workpiece as tilt data by calculating the sharpness matrix.

The sharpness analysis on the first target image to generate the sharpness matrix may be performed in various ways in the prior art, such as the 10/90 rising distance approach and frequency domain approach. Due to the particularity of the sharpness calculation, the sharpness matrix is not a pixel matrix, instead, the sharpness calculation is performed on each area after dividing the first target image into a plurality of regular areas. The tilt direction and the tilt angle of the target sheet workpiece may be calculated through the sharpness matrix.

In a possible implementation manner, calculating the tilt direction and tilt angle of the target sheet workpiece as tilt data according to the sharpness matrix includes: searching for sharpness elements with a sharpness lower than a standard value and with a same sharpness in the sharpness matrix as same degree sharpness elements; connecting the same degree sharpness elements into a straight line in the first target image, and calculating the tilt direction according to the straight line; obtaining a plurality of straight lines connected in the first target image by a plurality of sets of same degree sharpness elements, and calculating the tilt angle according to position relationships between the plurality of straight lines and the tilt direction.

The same degree sharpness elements may be elements with a sharpness lower than a standard value and with a same sharpness, and the standard value may be set by an expert. For example, if the standard value is 50, elements with a sharpness value lower than 50 in a sharpness matrix are extracted, and elements with a same sharpness among the extracted elements are taken as same degree sharpness elements.

In some embodiments, the management platform may connect the same degree sharpness elements into a straight line in the first target image, and calculate the tilt direction according to the straight line. For example, the tilt direction may be a linear direction, or the like.

In some embodiments, the management platform may obtain a plurality of straight lines connected by a plurality of sets of same degree sharpness elements in the first target image, and calculate the tilt angle according to position relationships and tilt direction of the plurality of straight lines. For example, the management platform may obtain the tilt angle by calculating an average value of the position relationships and tilt direction of the plurality of straight lines.

When the embodiment of the present disclosure is implemented, calculating the tilt direction through the sharpness matrix may also be realized through a trained sharpness recognition model. The specific calculation content of the sharpness recognition model includes finding sharpness elements with a same sharpness, and the sharpness elements refer to elements in a sharpness matrix. At the same time, the sharpness recognition model also needs to identify and connect same degree sharpness elements into a straight line. Since the corresponding same sharpness in a first target image may appear on both sides of a rotation axis, it is also necessary to connect the distribution of the same degree sharpness elements on both sides of the rotation axis into two mutually parallel lines after recognition. According to the above-mentioned generated straight lines, the tilt direction may be calculated, which is is generally the vertical direction of these straight lines.

When the embodiment of the present disclosure is implemented, based on the above embodiments, a distance between the plurality of straight lines and a resulted sharpness change gradient can be calculated, thereby calculating the tilt angle. Specifically, a sharpness recognition model may be used for implementation, by comparing sharpness change gradient with a preset gradient change table to calculate the tilt angle, in which the gradient change table is a corresponding relationship between the tilt angle and the sharpness change gradient. The gradient change table may be a fitted table or a dot matrix table. If the gradient change table is a dot matrix table, the tilt angle needs to be calculated by interpolation.

In some embodiments of the present disclosure, the management platform determines the tilt angle of the target sheet workpiece by calculation based on the same degree sharpness elements in the sharpness matrix. Determining tilt angle in this way can reduce error and improve the accuracy of the tilt data, which is convenient for subsequent adjustments.

The deformation data may be data reflecting a change in shape and position of the target sheet workpiece. For example, the deformation data may include size error of the target sheet workpiece, relative position error of the target sheet workpiece, or the like.

The size error of the target sheet workpiece may be a difference between a processed target sheet workpiece and a standard processed product. For example, an error between the size (e.g., length, width, or area) of the target sheet workpiece and the size of a standard processed product. The size of a standard processed product maybe adjusted according to an actual situation. The size error of the target sheet workpiece may be determined based on a relative position diagram, and the details of the relative position diagram can be found in the related descriptions below.

The relative position error of the target sheet workpiece may be a difference of relative position between a processed target sheet workpiece and a standard processed product in space. In some embodiments, the relative position error of the target sheet workpiece may include a difference between a relative position of an actual marking point or marking area and a standard relative position on each target sheet workpiece. The relative position may be represented by a graph structure, and further details can be found in the related descriptions below.

The relative position error may be represented by a numerical value of the relative position error of the target sheet workpiece. For example, if the relative position error of the target sheet workpiece is 0.1, it means that the relative position error of the target sheet workpiece is relatively small.

In some embodiments, the generating unit may determine the deformation data of the target sheet workpiece through a first preset method based on the first target image. For example, the generating unit may compare the first target image with a standard image, and calculate the obtained size error and relative position error as the deformation data. The standard image may be an ideal image determined by calculation. For more details about the first preset method, please refer to FIG. 4 and its related descriptions.

In some embodiments, the generating unit may determine the relative position diagram of a sheet workpiece through a relative position model based on the first target image; determine the relative position error and size error of the sheet workpiece as the deformation data based on the relative position diagram of the sheet workpiece. For more details about determining the deformation data, please refer to FIG. 4 and FIG. 5 and their related descriptions.

During the implementation of the embodiment of the present disclosure, in order to reduce a secondary photographing of the target sheet workpiece, a method of correcting a first target image is adopted for subsequent adjustment processing. The main correction method is to use a tilt correction model for processing, wherein the processing method is to stretch the image according to a correction direction and correction gradient and includes performing distortion repair on the stretched image.

In step 330, inputting, by a correcting unit, the tilt data and the first target image into a tilt correction model, and receiving a second target image output by the tilt correction model; the second target image being an image of the target sheet workpiece in a completely horizontal state.

In some embodiments, when the tilt data and the first target image are input into the tilt correction model, determining, through the tilt correction model, a correction direction according to the tilt direction, determining, through the tilt correction model, a correction gradient according to the tilt angle; and performing, through the tilt correction model, stretching process corresponding to the correction gradient on the first target image to the second target image according to the correction direction.

In some embodiments, the tilt correction model may be used to correct a tilt level of an image so that the image content is completely horizontal. There may be various types of tilt correction models, including a neural network model, a graph neural network model, or the like.

In some embodiments, input data of the tilt correction model may include the tilt data of the target sheet workpiece and the first target image; output data of the tilt correction model may include the second target image.

The second target image may be an image of the target sheet workpiece in a completely horizontal state.

In some embodiments, the tilt correction model may determine a correction direction based on the tilt direction, and a correction gradient based on the tilt angle. For example, if the tilt direction and tilt angle of the target sheet workpiece are clockwise deflection of 4°, a corresponding correction direction and correction gradient may be counterclockwise rotation of 4°.

In some embodiments, the tilt correction model may perform stretching processing corresponding to the correction gradient on the first target image based on the correction direction to determine the second target image. For example, if the first target image shows that the tilt direction and tilt angle of the target sheet workpiece are clockwise deflection of the tilt correction model may determine the second target image by performing stretching processing on the first target image with the correction gradient in the clockwise 5° direction.

In some embodiments of the present disclosure, the tilt correction model may determine the second target image by obtaining the correction direction and correction gradient of the first target image, which can reduce an error of the second target image, so that the target sheet workpiece in the obtained second target image tends to be more perfectly level.

In some embodiments, the tilt correction model may be obtained by training a plurality of labeled first training samples. For example, the plurality of labeled first training samples may be input into an initial tilt correction model, a loss function is constructed through a first label and a result of the initial tilt correction model, and parameters of the initial tilt correction model may be updated iteratively by gradient descent or other approaches based on the loss function. When a preset condition is met, a model training is completed, and a trained tilt correction model is obtained. The preset condition may be that the loss function converges, a count of iterations reaches a threshold, or the like.

In some embodiments, the first training samples may at least include tilt data of a sample sheet workpiece and a corresponding first target image. The first label may be a second target image corresponding to the sample sheet workpiece. A label may be obtained based on historical data or manually labeled.

In some embodiments of the present disclosure, the corrected second target image is obtained by inputting the tilt data of the target sheet workpiece and the first target image into the tilt correction model. Through this correction approach, the obtained second target image is more accurate, which reduces error and improves correction efficiency.

In step 340, performing, by a calibrating unit, calibration and identification on the second target image, generating horizontal adjustment data and rotational adjustment data corresponding to the second target image, calculating tilt adjustment data based on the tilt data, and adjusting clamping parameters based on tilt data and deformation data of a plurality of target sheet workpieces through a second preset method.

The calibrating unit may include a first calibrating unit and a second calibrating unit. The first calibrating unit may perform calibration and identification on the second target image, generate the horizontal adjustment data and rotational adjustment data corresponding to the second target image, and calculate the tilt adjustment data according to the tilt data. The second calibrating unit may adjust the clamping parameters through the second preset method based on the tilt data and deformation data of the plurality of target sheet workpieces.

The first calibrating unit may perform calibration processing on the second target image.

In some embodiments, the second target image may be calibrated and identified by the first calibrating unit to generate the horizontal adjustment data and rotational adjustment data corresponding to the second target image.

In some embodiments, the first calibrating unit may calculate the tilt adjustment data based on the tilt data of the target sheet workpiece.

The horizontal adjustment data may be position data for adjusting the second target image in the horizontal direction. For example, if an actual position coordinate of an identification area of the second target image is (6, 9), and a corresponding standard position coordinate is (6, 8), then the horizontal adjustment data may be (0, −1), etc. Coordinate may be determined based on a standard horizontal coordinate system.

The rotational adjustment data may be orientation data for adjusting the second target image on a horizontal plane. For example, if deviation between an actual orientation of the second target image and a standard orientation is 5° counterclockwise, the rotational adjustment data may be clockwise rotation of 5° based on a center of the target sheet workpiece, etc.

The tilt adjustment data may be data for adjusting a stretching level of the second target image. For example, if the tilt data of the target sheet workpiece is tilting 3° downward in the direction of clockwise deflection of 1°, the calculated tilt adjustment data may be stretching 3° upward in the direction of 1° clockwise, etc.

In a possible implementation manner, performing calibration and identification on the second target image, and generating the horizontal adjustment data and rotational adjustment data corresponding to the second target image includes: identifying a first feature point and a second feature point in the second target image, wherein the first feature point corresponds to an identification point or identification area of the target sheet workpiece; and the second feature point corresponds to another identification point or identification area of the target sheet workpiece; establishing a connection line between the first feature point and the second feature point as a calibration connection line; calculating an angle between the calibration connection line and a standard connection line in a standard template as the rotational adjustment data; wherein the standard template is an image of the target sheet workpiece in a standard processing position; and the standard connection line is a connection line between a first feature point and a second feature point in the standard template; calculating a difference between a midpoint of the calibration connection line and a midpoint of the standard connection line on a horizontal axis and a vertical axis in a standard horizontal coordinate system as the horizontal adjustment data; wherein the standard horizontal coordinate system is a Cartesian coordinate system established in a horizontal plane in the standard template.

The first feature point may be an identification point or an identification area corresponding to the target sheet workpiece. The second feature point may be another identification point or another identification area corresponding to the target sheet workpiece different from the first feature point. For example, the first feature point and the second feature point may be respectively an identification point (1, 2) and an identification point (3, 4) in the target sheet workpiece.

In some embodiments, the management platform may determine the first feature point and the second feature point based on the second target image. For example, the management platform may determine coordinates of an identification area corresponding to the target sheet workpiece based on the second target image, and determine the first feature point and the second feature point based on the coordinates.

The calibration connection line may be a connection line for calibrating the second target image. For example, the calibration connection line may be a straight line for obtaining adjustment parameters of the second target image (the horizontal adjustment data, the rotational adjustment data).

In some embodiments, the management platform may determine a line connecting the first feature point and the second feature point as the calibration connection line.

The standard template may be an image of the target sheet workpiece in a standard processing position.

In some embodiments, the management platform may determine the standard template based on each image with the smallest adjustment parameters in historical processing data.

The standard connection line may be used as a reference for adjusting the second target image. For example, the standard connection line may be compared with the calibration connection line to obtain adjustment parameters (the horizontal adjustment data, the rotational adjustment data) of the second target image.

In some embodiments, the management platform may determine a line connecting the first feature point and the second feature point in the standard template as the standard connection line.

The rotational adjustment data may be parameters for adjusting the orientation of the target sheet workpiece in horizontal direction. For example, the rotational adjustment data may include counterclockwise rotation of 10°, or the like.

In some embodiments, the management platform may determine the rotational adjustment data based on the calibration connection line and the standard connection line. For example, the management platform may calculate an angle between the calibration connection line and the standard connection line in the standard template as the rotational adjustment data.

The standard horizontal coordinate system may be a Cartesian coordinate system established on a horizontal plane in the standard template.

The horizontal adjustment data may be data for adjusting the position of the target sheet workpiece in horizontal direction. For example, the horizontal adjustment data may include horizontal adjustment distance of (1, −1), or the like.

In some embodiments, the management platform may determine the horizontal adjustment data based on the calibration connection line and the standard connection line. For example, the management platform calculates a difference between a midpoint of the calibration connection line and a midpoint of the standard connection line on a horizontal axis and a vertical axis in a standard horizontal coordinate system as the horizontal adjustment data.

When the embodiment of the present disclosure is implemented, a scheme of performing rotational adjustment and horizontal displacement adjustment through two feature points is adopted, wherein the feature points are features on the target sheet workpiece, including but not limited to parts, screws, signs, etc., an angle that needs to be rotated and adjusted may be calculated through the connection line between two feature points. Since the scheme does not require very delicate recognition of feature points, it can reduce a count of calculations generated by accurate template matching. Similarly, a count of required horizontal displacement adjustment may be calculated by calibrating a displacement deviation of the midpoint of the connection line. The horizontal adjustment data refers to adjustment data that moves horizontally or vertically in the standard horizontal coordinate system.

In some embodiments of the present disclosure, the management platform determines horizontal adjustment parameters and rotational adjustment parameters of the target sheet workpiece based on the calibration connection line and the standard connection line. In this way, error of the horizontal adjustment parameters and the rotational adjustment parameters can be reduced, so that the adjustment of the target sheet workpiece is more precise.

In some embodiments, the second calibrating unit may calculate a difference between a current position and a standard position of the target sheet workpiece, and a difference between a current size and a standard size of the target sheet workpiece as the deformation data of the target sheet workpiece.

In some embodiments, the second calibrating unit may determine the deformation data through a first preset method based on the first target image. For more details about the deformation data, please refer to FIG. 4 and its related descriptions.

In some embodiments, the second calibrating unit is configured to adjust the clamping parameters through a second preset method based on the tilt data and deformation data of the plurality of sheet workpieces. For more details, please refer to FIG. 6 and its related descriptions.

In step 350, sending, by an adjusting unit, the horizontal adjustment data, the rotational adjustment data, and the tilt adjustment data to the production line through the sensor network platform to adjust a bearing mechanism of the target sheet workpiece.

The bearing mechanism may be a mechanism that performs processing on the target sheet workpiece.

In some embodiments, the bearing mechanism may obtain the horizontal adjustment data, rotational adjustment data, and tilt adjustment data of the target sheet workpiece based on the sensor network platform, and adjust placement position and direction of the target sheet workpiece before processing.

In step 360, sending, by a communicating unit, the horizontal adjustment data, rotational adjustment data, and tilt adjustment data to the user platform through the service platform for display.

In some embodiments, the communicating unit may send the horizontal adjustment data, rotational adjustment data, and tilt adjustment data of the target sheet workpiece to the user platform through the service platform, and display these data to a user in sequence.

It should be noted that the above descriptions about the process 300 are only for illustration and description, and do not limit the scope of application of the present disclosure. For those skilled in the art, various modifications and changes can be made to the process 300 under the guidance of the present disclosure. However, such modifications and changes are still within the scope of the present disclosure.

FIG. 4 is a flowchart illustrating an exemplary process for determining deformation data according to some embodiments of the present disclosure.

As shown in FIG. 4, process 400 includes step 410 and step 420.

In step 410, determining a relative position diagram of the target sheet workpiece based on the first target image.

The relative position diagram of the target sheet work may be a diagram showing an actual position relationship of a sheet workpiece. For example, the relative position diagram may be a feature diagram including nodes and edges. The nodes of the relative position diagram may represent identification points or identification areas on the sheet workpiece, adjacent nodes may be connected by edges, the edges of the relative position diagram may represent an adjacent relationship between the identification points or identification areas. Attribute values of the nodes are coordinates of the identified points or identification areas, and attribute values of the edges are a distance between the identified points or identification areas. As shown in FIG. 5b, attribute value of node A in the relative position diagram 530 may be identification area coordinate (1, 1), and attribute value of node B adjacent to node A may be identification area coordinate (1, 2), attribute value of an edge between node A and node B is 3.1, indicating that the distance between node A and node B is 3.1 mm.

In some embodiments, the relative position diagram of the target sheet workpiece may be determined by extracting a position feature of the target sheet workpiece in the first target image.

In some embodiments, the relative position diagram of the target sheet workpiece may be determined based on a relative position model. For more details about the relative position model, please refer to FIG. 5a and its related descriptions.

In step 420, determining the deformation data of the target sheet workpiece based on the relative position diagram of the target sheet workpiece.

In some embodiments, the deformation data (including relative position error and size error) of the target sheet workpiece may be determined based on the relative position diagram of the target sheet workpiece. For more details about the deformation data, relative position error, and size error, please refer to related descriptions in the step 320 in FIG. 3.

In some embodiments, the management platform may determine the relative position error by calculating a similarity between the relative position diagram and a standard relative position diagram.

The similarity is used to indicate a proximity degree of the relative position diagram to the standard relative position diagram. In some embodiments, the similarity between the relative position diagram and the standard relative position diagram may be calculated by a histogram, hash value, Hamming distance, cosine distance, picture structure metric, or other feasible approaches.

In some embodiments, the management platform may determine the relative position error of the target sheet workpiece through a first preset method based on the similarity. The first preset method may include dimension difference calculation, coordinate difference calculation, or the like. The first preset method may be determined based on equation (1):

$$\text{relative position error}=1-\text{similarity} \qquad (1)$$

The first preset method may further include: according to a preset corresponding relationship between the similarity and the relative position error, determining the relative position error corresponding to the similarity (for example, by looking up a table based on the similarity). The first preset method may further include calculating the relative position error through a histogram, hash value, Hamming distance, cosine distance, picture structure metric, or other feasible approaches.

In some embodiments, the management platform may determine the size error of the target sheet workpiece based on the relative position diagram and the standard relative position diagram. In some embodiments, the management platform may calculate a sum of attribute values of all edges in the relative position diagram and a sum of attribute values of all edges in the standard relative position based on the relative position diagram and the standard relative position diagram, determine a change rate (for example, the change rate may be a ratio of an absolute value after the subtraction of the two sums to the sum of attribute values of all edges in the standard relative position diagram) based on the sum of attribute values of all edges in the relative position diagram and the sum of attribute values of all edges in the standard relative position diagram, and then determine the change rate as the size error, or determine the size error corresponding to the change rate based on a corresponding relationship between a preset change rate and preset size error (for example, by looking up a table based on the change rate).

In some embodiments of the present disclosure, the management platform determines the deformation data of the target sheet workpiece based on the first target image. In this way, error of the deformation data can be reduced, so that the obtained deformation data is more accurate, and the subsequent adjustment of the target sheet workpiece is more precise.

Figure 5A:
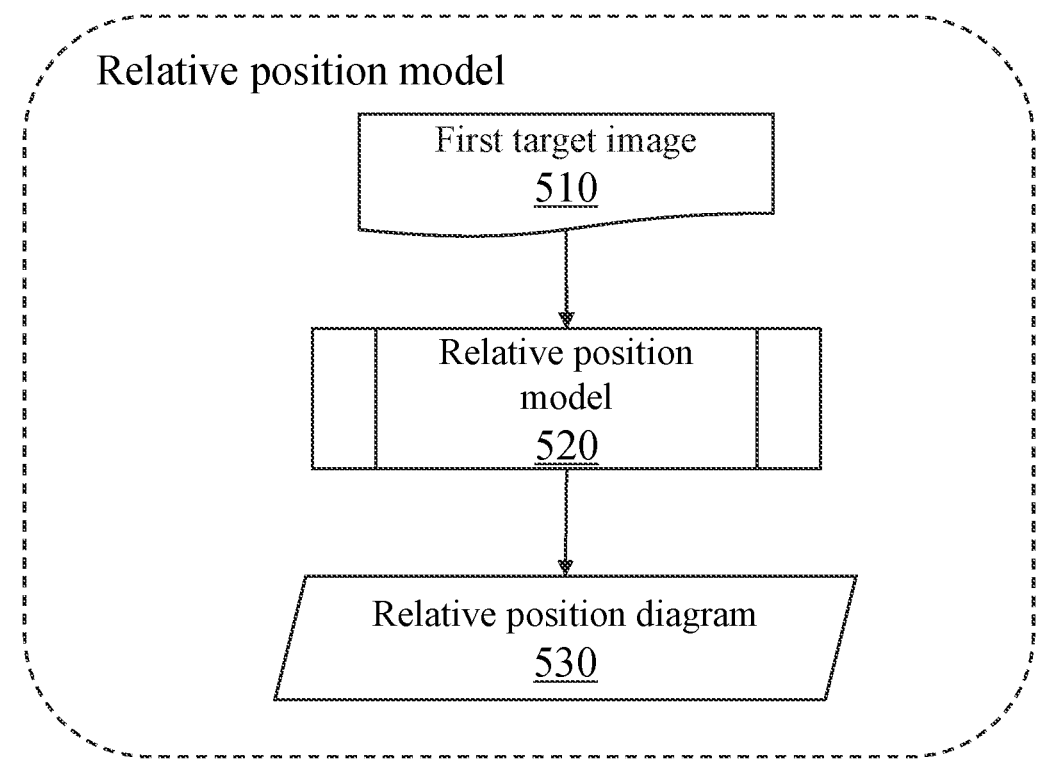
FIG. 5a is a schematic diagram illustrating an exemplary relative position model according to some embodiments of the present disclosure.
Figure 5B:
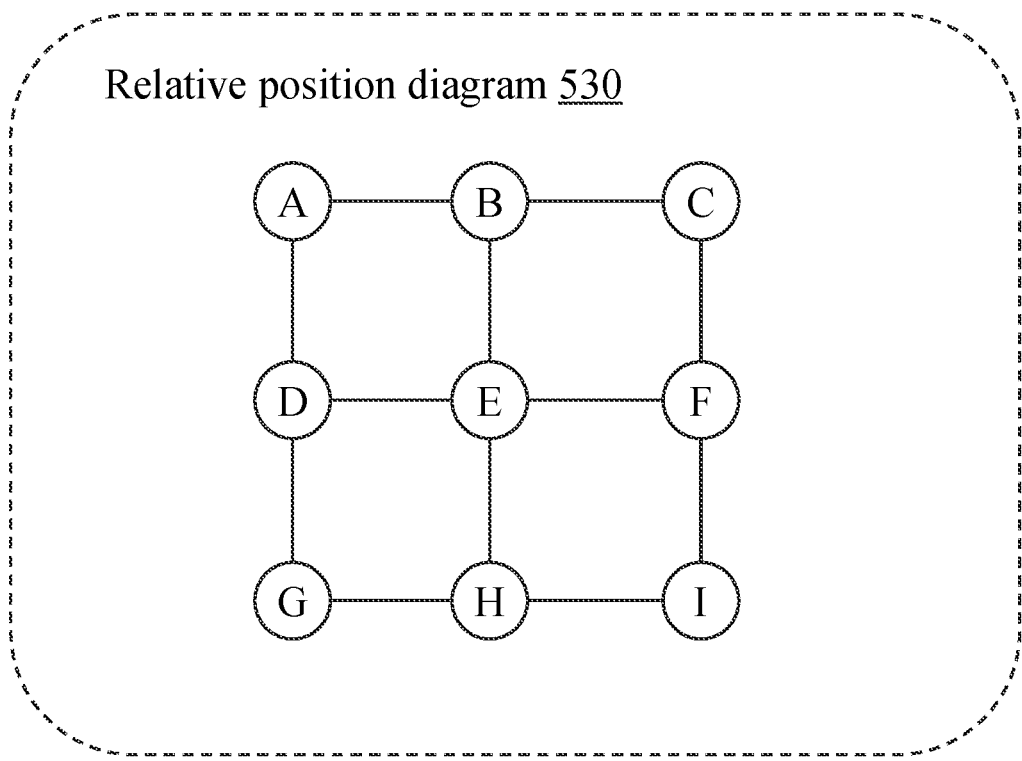
FIG. 5b is a schematic diagram illustrating an exemplary relative position diagram according to some embodiments of the present disclosure.

FIG. 5a is a schematic diagram illustrating an exemplary relative position model according to some embodiments of the present disclosure.

In some embodiments, the relative position model may be configured to obtain a relative position of each node of an image. There may be a plurality of types of the relative position model, for example, including a neural network model, a graph neural network model, or the like.

In some embodiments, an input of relative position model 520 may include first target image 510; an output of the relative position model 520 may include relative position diagram 530.

A graph structure of the relative position diagram 530 is shown in FIG. 5b, including a plurality of nodes A, B, C, D, E, F, G, H, and I, and edges connected between adjacent nodes, such as AB, BC, etc.

For more details about the first target image, please refer to FIG. 3 and its related descriptions. For more details about the relative position diagram, please refer to FIG. 4 and its related descriptions.

In some embodiments, the relative position model 520 may be obtained by training a plurality of second training samples with a second label. For example, the plurality of second training samples with a second label may be input into an initial relative position model, a loss function is constructed through the second label and a result of the initial relative position model, and parameters of the initial relative position model may be updated iteratively by gradient descent or other approaches based on the loss function. When a preset condition is met, model training is completed, and a trained relative position model is obtained. The preset condition may be that the loss function converges, a count of iterations reaches a threshold, or the like.

In some embodiments, the second training samples may at least include historical first target images. A label may be a corresponding historical relative position diagram, and the historical relative position diagram includes information such as nodes, edges, and corresponding node values and edge values. The label may be obtained based on historical data, or be labeled manually.

In some embodiments of the present disclosure, the management platform obtains the relative position diagram based on the relative position model. Obtaining the relative position diagram in this way makes data of the relative position diagram more accurate and improves the efficiency of obtaining the relative position diagram.

FIG. 6 is a flowchart illustrating an exemplary process for adjusting clamping parameters according to some embodiments of the present disclosure. As shown in FIG. 6, process 600 includes the following contents.

Clamping parameters of the target sheet workpiece may be parameters related to clamps acting on the workpiece before the workpiece starts to be processed. For example, the clamping parameters of the target sheet workpiece may include clamping force of a clamp, a placement position, or the like.

In some embodiments, the second calibrating unit may adjust the clamping parameters of the target sheet workpiece through a second preset method based on tilt data and deformation data of a plurality of target sheet workpieces. The second preset method may include setting different clamping parameters and repeatedly screening clamping parameters with the smallest tilt data and deformation data, or other feasible approaches.

In step 610, processing the tilt data and deformation data of the plurality of target sheet workpieces to obtain feature value.

The feature value may be data representing the clamping force and the placement position of the clamp of a bearing mechanism. For example, the feature value may be determined from the tilt data (tilt direction, tilt angle), deformation data (size error, relative position error) of the plurality of target sheet workpieces, etc.

In some embodiments, the management platform may determine the feature value by extracting an average value of the tilt data and deformation data or distribution parameters. The distribution parameters may be standard deviation, variance, and other parameters reflecting distribution.

In step 620, in response to the feature value not satisfying a preset condition, determining candidate adjustment clamping parameters through a vector database.

In some embodiments, when the feature value does not satisfy a preset condition, candidate adjustment clamping parameters may be determined through a vector database. The preset condition may include that the feature value is within a threshold range, and the threshold may be set by an expert.

The vector database may be a database for storing historical adjustment data. For example, a vector database may be used to store a plurality of sets of historical feature values. Each set of historical feature values may include historical feature value, corresponding feature vector before adjustment, and adjustment clamping parameters, etc.

The candidate adjustment clamping parameters may be a plurality of parameters for adjusting the clamping force and the placement position of the clamp. For example, candidate adjustment clamping parameters may include (40, 4, 5), then the candidate adjustment clamping parameters indicate that the clamping force of the clamp is 40 N, the placement position is (4, 5), etc. Coordinates may be determined based on a coordinate system established on a clamping plane.

In some embodiments, the management platform may construct feature vectors based on the feature value, select one or more vectors whose distance from the feature vectors is smaller than a threshold in the vector database based on the feature vectors as reference vectors, and determine clamping parameters corresponding to the reference vectors as candidate adjustment clamping parameters. The threshold may be set by an expert.

In some embodiments, the feature vectors may include the feature value (average value of the tilt data and the deformation data, the distribution parameters, etc.). For example, feature vector may be (a, b, c, d), and the feature vector indicates that a sheet workpiece is averagely tilted upward by b° in direction a; the deviation of the average size error with respect to a standard size is c $mm^2$; and the distribution parameters is d. As another example, feature vector may be (10, 2, −3, 1, −2), the feature vector indicates that a sheet workpiece is averagely tilted upward by 2° in the counter-clockwise direction of 10°; the average size error is 3 $mm^2$ smaller than a standard size; and the relative position is (1, −2) from the standard position. Position vectors may be determined based on a standard horizontal coordinate system.

For more details about determining reference vectors based on vector distance, please refer to step 630 and its related descriptions.

In some embodiments, a calibrating unit may determine target adjustment parameters based on historical adjustment data. For example, the calibrating unit may determine clamping parameters corresponding to vectors with the closest distance (highest similarity) to the feature vectors among the reference vectors as the target adjustment clamping parameters.

In step 630, adjusting, by a calibrating unit, the candidate adjustment clamping parameters to obtain target adjustment clamping parameters.

The target adjustment clamping parameters may be parameters that are actually used to adjust the clamping force and placement position of a clamp.

For more details about the target adjustment clamping parameters, please refer to the candidate adjustment clamping parameters and its related descriptions.

In some embodiments, the management platform may determine adjustment coefficients based on the vector distance between the feature vectors and the reference vectors, and determine the target adjustment clamping parameters based on the adjustment coefficients.

In some embodiments, the adjustment coefficients may be used to represent a level of correlation between the candidate adjustment clamping parameters and the target adjustment clamping parameters, and the larger the adjustment coefficients, the smaller the correlation. The adjustment coefficients may be determined based on the vector distance between the feature vectors and the reference vectors and a preset relationship between the adjustment coefficients. The preset relationship may be that the vector distance is proportional to the adjustment coefficients, for example, the larger the vector distance between the feature vectors and the reference vectors, the larger the adjustment coefficients and the smaller the correlation. The preset relationship may be linear or non-linear.

In some embodiments, the target adjustment clamping parameters may be comprehensively determined based on the adjustment coefficients and the candidate adjustment clamping parameters. Exemplarily, the target adjustment clamping parameters may be determined by the following equation (2):

$$\text{target adjustment clamping parameter} = \sum_1^n \text{adjustment coefficents}_i \times \text{candidate adjustment clamping parameters}_i \quad (2)$$

where adjustment coefficents$_i$ denotes adjustment coefficients corresponding to the i-th candidate adjustment clamping parameters, candidate adjustment clamping parameters$_i$ denotes the i-th candidate adjustment clamping parameters, i=1~n, n denotes a total count of candidate adjustment clamping parameters.

In some embodiments of the present disclosure, the calibrating unit determines the target adjustment clamping parameters based on the candidate adjustment clamping parameters and the adjustment coefficients, which can make the obtained target adjustment clamping parameters more accurate and more in line with an actual adjustment situation.

In some embodiments, when the collected feature value meets the preset condition, the management platform may correspondingly store the feature vectors before performing the target adjustment clamping parameters and the target adjustment clamping parameters in a historical vector database, so as to increase a count of data in the vector database and improve the accuracy of target adjustment parameters.

In some embodiments of the present disclosure, the management platform adjusts the clamping parameters through a preset method, which can reduce the deformation of the sheet workpiece, reduce the error caused by the subsequent processing of the sheet workpiece, and improve the quality of a product.

The basic concepts have been described above, obviously, for those skilled in the art, the above-detailed disclosure is only an embodiment and does not constitute a limitation to the present disclosure. Although not expressly stated here, those skilled in the art may make various modifications, improvements, and corrections to the present disclosure. Such modifications, improvements, and corrections are suggested in the present disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure, or characteristic related to at least one embodiment of the present disclosure. Therefore, it should be emphasized and noted that two or more references to "an embodiment" or "one embodiment" or "an alternative embodiment" in different places in the present disclosure do not necessarily refer to the same embodiment. In addition, certain features, structures, or characteristics in one or more embodiments of the present disclosure may be properly combined.

In addition, unless explicitly stated in the claims, the order of processing elements and sequences described in the present disclosure, the use of numbers and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in the present disclosure and help the understanding of one or more embodiments of the present disclosure, in the foregoing description of the embodiments of the present disclosure, sometimes multiple features are combined into one embodiment, drawings, or descriptions thereof. This method of disclosure does not, however, imply that the subject matter of the present disclosure requires more features than are recited in the claims. Rather, claimed subject matter may lie in less than all features of a single foregoing disclosed embodiment.

In some embodiments, numbers describing the number of components and attributes are used. It should be understood that such numbers used in the description of the embodiments use the modifiers "about", "approximately" or "substantially" in some examples. Unless otherwise stated, "about", "approximately" or "substantially" indicates that a variation of ±20% is allowed forthe stated figure. Accordingly, in some embodiments, numerical parameters used in the present disclosure and claims are approximations that can vary depending on the desired characteristics of individual embodiments. In some embodiments, numerical parameters should take into account the specified significant digits and adopt the general digit reservation method. Although the numerical ranges and parameters used in some embodiments of the present disclosure to confirm the breadth of the range are approximations, in specific embodiments, such numerical values should be set as precisely as practicable.

Each patent, patent application, patent application publication, and other material, such as article, book, specification, publication, document, etc., cited in the present disclosure is hereby incorporated by reference in its entirety. Application history documents that are inconsistent with or conflict with the content of the present disclosure are excluded, and documents (currently or later appended to the present disclosure) that limit the broadest scope of the claims of the present disclosure are excluded. It should be noted that if there is any inconsistency or conflict between the descriptions, definitions, and/or terms used in the accompanying materials of the present disclosure and the contents of the present disclosure, the descriptions, definitions, and/or terms used in the present disclosure shall prevail.

Finally, it should be understood that the embodiments described in the present disclosure are only used to illustrate the principles of the embodiments of the present disclosure. Other modifications are also possible within the scope of the present disclosure. Therefore, by way of example and not limitation, alternative configurations of the embodiments of the present disclosure may be considered consistent with the teachings of the present disclosure. Accordingly, the embodiments of the present disclosure are not limited to the embodiments explicitly introduced and described in the present disclosure.

What is claimed is:

1. A control system of an Industrial Internet of Things for sheet workpiece processing comprising a service platform, a management platform, and a sensor network platform, connected in sequence, wherein the management platform performs operations to:
   obtain a first target image on a production line through the sensor network platform, wherein the first target image is an image of a target sheet workpiece under a fixed focal length condition;
   perform sharpness analysis on the first target image to generate a sharpness matrix and calculate a tilt direction and a tilt angle of the target sheet workpiece as tilt data according to the sharpness matrix;
   input the tilt data and the first target image into a tilt correction model and receive a second target image output by the tilt correction model, wherein the second target image is an image of the target sheet workpiece in a completely horizontal state;
   perform calibration and identification on the second target image, generate horizontal adjustment data and rotational adjustment data corresponding to the second target image, and calculate tilt adjustment data according to the tilt data;
   send the horizontal adjustment data, the rotational adjustment data, and the tilt adjustment data to the production line through the sensor network platform to adjust a bearing mechanism of the target sheet workpiece; and
   send the horizontal adjustment data, the rotational adjustment data, and the tilt adjustment data to a user platform through the service platform for display;
   wherein the management platform further performs operations to: search for sharpness elements with a sharpness lower than a standard value and with a same sharpness in the sharpness matrix as same degree sharpness elements; connect the same degree sharpness elements into a straight line in the first target image, and calculate the tilt direction according to the straight line; and obtain a plurality of straight lines connected by a plurality of sets of same degree sharpness elements in the first target image, and calculate the tilt angle according to position relationships between the plurality of straight lines and the tilt direction.

2. The Industrial Internet of Things for sheet workpiece processing according to claim 1, wherein the inputting the tilt data and the first target image into the tilt correction model, further to: determine a correction direction according to the tilt direction, and determine a correction gradient according to the tilt angle through the tilt correction model; and perform stretching processing corresponding to the correction gradient on the first target image to the second target image according to the correction direction through the tilt correction model.

3. The Industrial Internet of Things for sheet workpiece processing according to claim 1, wherein the management platform further performs operations to: identify a first feature point and a second feature point in the second target image, wherein the first feature point corresponds to an identification point or an identification area of the target sheet workpiece, and the second feature point corresponds to another identification point or another identification area of the target sheet workpiece; establish a connection line between the first feature point and the second feature point as a calibration connection line; calculate an angle between the calibration connection line and a standard connection line in a standard template as the rotational adjustment data, wherein the standard template is an image of the target sheet workpiece in a standard processing position, and the standard connection line is a connection between a first feature point and a second feature point in the standard template; and calculate a difference between a midpoint of the calibration connection line and a midpoint of the standard connection line on a horizontal axis and a vertical axis in a standard horizontal coordinate system as the horizontal adjustment data, wherein the standard horizontal coordinate system is a Cartesian coordinate system established on a horizontal plane in the standard template.

4. The Industrial Internet of Things for sheet workpiece processing according to claim 1, wherein the service platform includes a general service platform and at least two service sub-platforms, and different service sub-platforms are configured to receive different types of data transmitted by the management platform; the general service platform summarizes data collected by all the service sub-platforms and sends the data to the user platform for display; the management platform includes a plurality of mutually independent management sub-platforms, and the sensor network platform includes a general sensor network platform and at least two sensor network sub-platforms, the general sensor network platform receives all production data on the production line, and the sensor network sub-platforms send different types of production data to the management platform respectively.

5. A control method of Industrial Internet of Things for sheet workpiece processing, wherein the method is executed by a management platform, comprising:
   obtaining a first target image on a production line through a sensor network platform, wherein the first target image is an image of a target sheet workpiece under a fixed focal length condition;
   performing sharpness analysis on the first target image to generate a sharpness matrix, and calculating a tilt direction and a tilt angle of the target sheet workpiece as tilt data according to the sharpness matrix;
   inputting the tilt data and the first target image into a tilt correction model, and receiving a second target image output by the tilt correction model, wherein the second target image is an image of the target sheet workpiece in a completely horizontal state;
   performing calibration and identification on the second target image, generating horizontal adjustment data and rotational adjustment data corresponding to the second target image, and calculating tilt adjustment data according to the tilt data;

sending the horizontal adjustment data, the rotational adjustment data, and the tilt adjustment data to the production line through the sensor network platform to adjust a bearing mechanism of the target sheet workpiece; and sending the horizontal adjustment data, the rotational adjustment data, and the tilt adjustment data to a user platform through a service platform for display.

6. The control method according to claim 5, wherein the calculating a tilt direction and a tilt angle of the target sheet workpiece as tilt data according to the sharpness matrix includes:

searching for sharpness elements with a sharpness lower than a standard value and with a same sharpness in the sharpness matrix as same degree sharpness elements;

connecting the same degree sharpness elements into a straight line in the first target image, and calculating the tilt direction according to the straight line; and obtaining a plurality of straight lines connected in the first target image by a plurality of sets of same degree sharpness elements, and calculating the tilt angle according to position relationships between the plurality of straight lines and the tilt direction.

7. The control method according to claim 5, wherein the inputting the tilt data and the first target image into a tilt correction model, and receiving a second target image output by the tilt correction model includes:

when inputting the tilt data and the first target image into the tilt correction model, determining, through the tilt correction model, a correction direction according to the tilt direction, and a correction gradient according to the tilt angle; and performing, through the tilt correction model, stretching processing corresponding to the correction gradient on the first target image to the second target image according to the correction direction.

8. The control method according to claim 5, wherein the performing calibration and identification on the second target image, and the generating horizontal adjustment data and rotational adjustment data corresponding to the second target image includes:

identifying a first feature point and a second feature point in the second target image, wherein the first feature point corresponds to an identification point or an identification area of the target sheet workpiece, and the second feature point corresponds to another identification point or another identification area of the target sheet workpiece;

establishing a connection line between the first feature point and the second feature point as a calibration connection line;

calculating an angle between the calibration connection line and a standard connection line in a standard template as the rotational adjustment data, wherein the standard template is an image of the target sheet workpiece in a standard processing position, and the standard connection line is a connection line between a first feature point and a second feature point in the standard template; and calculating a difference between a midpoint of the calibration connection line and a midpoint of the standard connection line on a horizontal axis and vertical axis in a standard horizontal coordinate system as the horizontal adjustment data, wherein the standard horizontal coordinate system is a Cartesian coordinate system established on a horizontal plane in the standard template.

* * * * *